US012782952B2

(12) United States Patent
Zhang et al.

(10) Patent No.: US 12,782,952 B2
(45) Date of Patent: Nov. 3, 2026

(54) SYSTEM AND METHOD FOR DETECTING DYNAMIC EVENTS

(71) Applicant: The University of Hong Kong, Hong Kong (CN)

(72) Inventors: Fu Zhang, Hong Kong (CN); Wei Xu, Hong Kong (CN); Huajie Wu, Hong Kong (CN)

(73) Assignee: The University of Hong Kong, Hong Kong (CN)

( * ) Notice: Subject to any disclaimer, the term of this patent is extended or adjusted under 35 U.S.C. 154(b) by 92 days.

(21) Appl. No.: 18/850,969

(22) PCT Filed: Apr. 3, 2023

(86) PCT No.: PCT/CN2023/085922
§ 371 (c)(1),
(2) Date: Sep. 25, 2024

(87) PCT Pub. No.: WO2023/193681
PCT Pub. Date: Oct. 12, 2023

(65) Prior Publication Data

US 2025/0216850 A1 Jul. 3, 2025

Related U.S. Application Data

(60) Provisional application No. 63/362,445, filed on Apr. 4, 2022.

(51) Int. Cl.
*G05D 1/24* (2024.01)
*G05D 1/242* (2024.01)
*G05D 1/633* (2024.01)

(52) U.S. Cl.
CPC ............ *G05D 1/242* (2024.01); *G05D 1/633* (2024.01)

(58) Field of Classification Search
None
See application file for complete search history.

(56) References Cited

U.S. PATENT DOCUMENTS 9,110,163 B2 * 8/2015 Rogan .................... G01S 17/50
11,442,591 B2 * 9/2022 Vathauer ................ G06F 3/011
(Continued)

OTHER PUBLICATIONS

International Search Report and Written Opinion mailed Jun. 23, 2023, for Application No. PCT/CN2023/085922. 8 pages.
(Continued)

*Primary Examiner* — Abdhesh K Jha
(74) *Attorney, Agent, or Firm* — Leason Ellis LLP

(57) ABSTRACT

A moving object detection system and method is provided. The system includes an input module capturing a point cloud comprising measurements of distances to points on one or more objects and a detection module receiving the point cloud captured by the input module and configured to determine whether the objects are moving objects. The determination of moving objects is performed by determining whether currently measured points occlude any previously measured points, and/or whether the currently measured points recursively occlude any previously measured points, and/or whether the currently measured points are recursively occluded by any previously measured points.

32 Claims, 6 Drawing Sheets

(56) References Cited

U.S. PATENT DOCUMENTS

| | | | | |
|---|---|---|---|---|
| 2014/0347475 | A1* | 11/2014 | Divakaran ............ | G06V 20/52 348/135 |
| 2018/0004227 | A1 | 1/2018 | Browning et al. | |
| 2020/0111358 | A1 | 4/2020 | Parchami et al. | |
| 2020/0217964 | A1 | 7/2020 | Chen et al. | |
| 2021/0003684 | A1 | 1/2021 | Gong et al. | |
| 2021/0389466 | A1 | 12/2021 | Dimitrov | |

OTHER PUBLICATIONS

Alonso et al. "3D-MiniNet: Learning a 2D represenation from point clouds for fast and efficient 3D LiDAR semantic segmentation." IEEE Robot Automat Lett. Oct. 2020; 5(4): 5432-9. 8 pages.
Asvadi et al. "3D Lidar-based static and moving obstacle detection in driving environments: An approach based on voxels and multi-region ground planes." Robot Autonom Sys. Sep. 2016; 83: 299-311. 13 pages.
Biasutti et al. "LU-Net: An efficient network for 3D LiDAR point cloud semantic segmentation based on end-to-end- learned 3D features and U-Net." 2019 IEEE/CVF Int Conf Comp Vision Workshop (ICCVW). 2019. 942-50. 9 pages.
Chen et al. "SuMa++: Efficient LiDAR-based semantic SLAM." 2019 IEEE/RSJ Int Conf Intell Robots Sys (IROS). Nov. 3-8, 2019; 4530-7. 8 pages.
Chen et al. "Moving Object Segmentation in 3D LiDAR Data: A Learning-based Approach Exploiting Sequential Data." arXiv. 2021; arXiv:2105.08971. 8 pages.
Cortinhal et al. "SalsaNext: Fast, uncertainty-aware semantic segmentation of LiDar point clouds for autonomous driving." Proc IEEE Int Cof Robot Automat. 2018; 5 pages.
Dewan et al. "Deep semantic classification for 3D LiDAR data." 2017 IEEE/RSJ Int Conf Intell Robot Sys (IROS). Sep. 2017; 3544-9. 6 pages.
Dewan et al. "Motion-based detection and tracking in 3D LiDAR Scans." 2016 IEEE Int Conf Robot Automat (ICRA). 2016; 4508-13. 6 pages.
Dewan et al. "Rigid scene flow for 3D LiDAR Scans." 2016 IEEE/RSJ Int Conf Intel Robots Sys (IROS). 2016; 1765-70. 6 pages.
Dubé et al. "SegMap: 3D segment mapping using data-driven descriptors." arXiv. 2018; arXiv:1804.09557. 11 pages.
Gehrung et al. "An approach to extract moving objects from mls data using a volumetric background representation." ISPRS Ann Photogram Rem Sens Spatial Info Sciences. 2017; 4: 107-14. 8 pages.
Kümmerle et al. "A navigation system for robots operating in crowded urban environments." 2013 IEEE Int Conf Robot Automat (ICRA). May 6-10, 2013; 3225-32; 8 pages.
Li et al. "Multi-scale interaction for real-time LiDAR data segmentation on an embedded platform." IEEE Robot Automat Lett. Apr. 2022; 7(2): 738-45. 8 pages.
Milioto et al. "RangeNet++: Fast and accurate LiDAR semantic segmentation." 2019 IEEE/RSJ Int Conf Intell Robot Sys (IROS). Nov. 2019; 4213-20. 8 pages.
Moosmann et al. "Joint self-localization and tracking of generic objects in 3D range data." 2013 IEEE Int Conf Robot Automat. May 6-10, 2013; 1146-52. 7 pages.
Pagad et al. "Robust method for removing dynamic objects from point clouds." 2020 IEEE Int Conf Robot Automat (ICRA). 2020; 10765-71. 7 pages.
Pfreundschuh et al. "Dynamic object aware lidar slam based on automatic generation of training data." arXiv. 2021; arXiv:2104.03657. 7 pages.
Ruchti et al. "Mapping with dynamic-object probabilities calculated from single 3D range scans." IEEE Int Conf Robot Autom. 2018. 6 pages.
Schauer et al. The peopleremover—removing dynamic objects from 3-D point cloud data by traversing a voxel occupancy grid. IEEE Robot Automat Lett. Jul. 2018; 3(3): 1679-86.
Thomas et al. KPConv: Flexible and deformable convolution for opint clouds. Proc IEEE/CVF Int Conf Comp Vision. 2019; 6410-9. 10 pages.
Underwood et al. "Explicit 3D change detection using ray-tracing in spherical coordinates." 2013 IEEE Int Conf Robot Automat. May 2013; 4735-41. 7 pages.
Vu et al. "Grid-based localization and online mapping with moving objects deteection and tracking: new results." 2008 IEEE Intell Vehicles Symp. Jun. 2008; 684-9. 6 pages.
Wang et al. "What could move? Finding cars, pedestrians and bicyclists in 3D laser data." Proc IEEE Int Conf Robot Autom. 2012; 7 pages.
Xiao et al. "Street environment change detection from mobile laser scanning point clouds." ISPRS J Photogram Remote Sens. 2015; 107: 38-49. 12 pages.
Yoon et al. "Mapless online detection of dynamic objects in 3d lidar." 2019 16th Conf Comp Robot Vision (CRV). 2019; 113-20. 7 pages.
Zhao et al. "Lidar mapping optimization based on lightweight semantic segmentation." IEEE Trans Intell Vehicles. Sep. 2019; 4(3): 353-62. 10 pages.

* cited by examiner

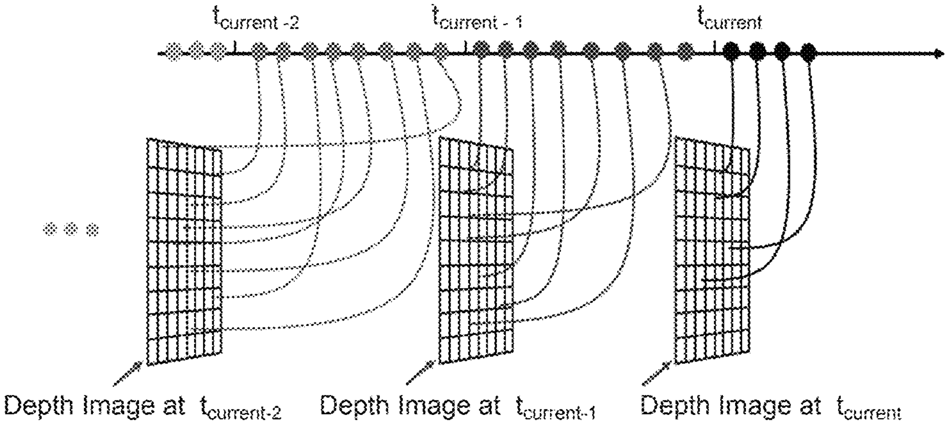
FIG. 7
FIG.8A
FIG.8B
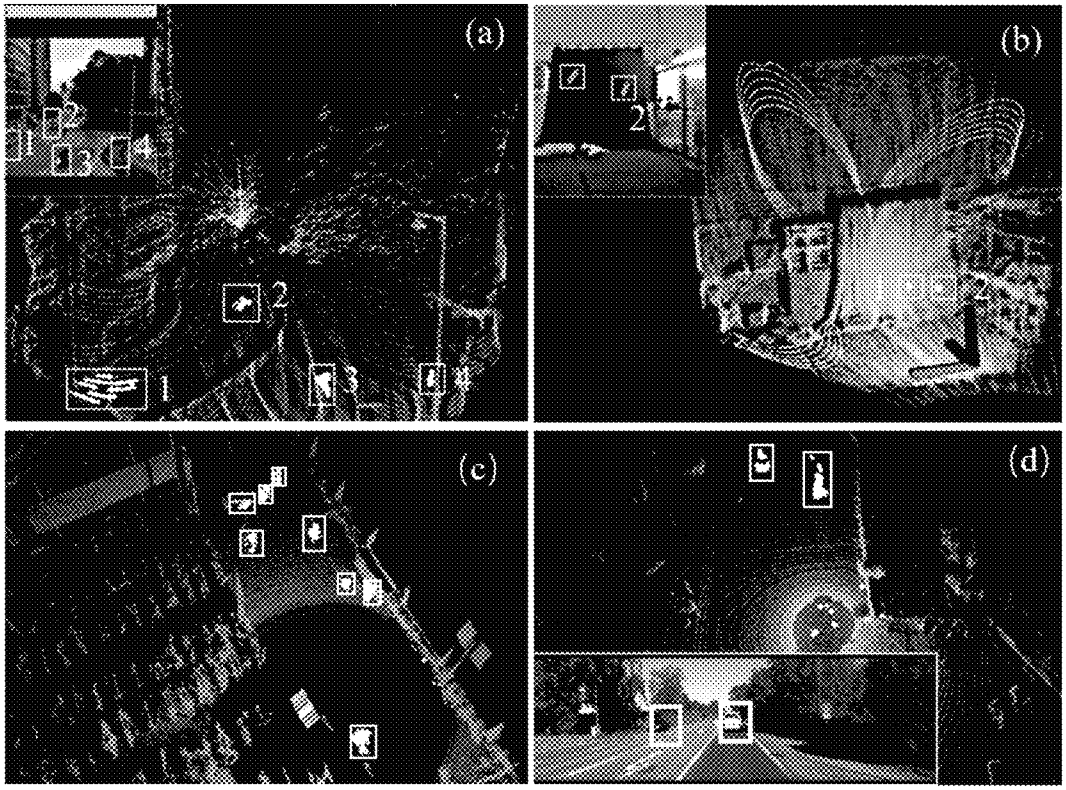
FIG.8C
FIG.8D

SYSTEM AND METHOD FOR DETECTING DYNAMIC EVENTS

CROSS-REFERENCE TO RELATED APPLICATION

This application is a U.S. National Stage Application under 35 U.S.C. § 371 of International Patent Application No. PCT/CN2023/085922, filed Apr. 3, 2023, and claims the benefit of priority under 35 U.S.C. Section 119(e) of U.S. Provisional Application No. 63/362,445, filed Apr. 4, 2022, which is hereby incorporated by reference in its entirety including any tables, figures, or drawings. The International Application was published on Oct. 12, 2023, as International Publication No. WO 2023/193681 A1.

BACKGROUND OF THE INVENTION

Ranging sensors such as light detection and ranging (LiDAR) sensors, laser scanners, ultrasonic sensors, or radars have been widely used in a variety of applications including robot/unmanned aerial vehicles (UAVs) navigation, autonomous driving, environment monitoring, traffic monitoring, surveillance, and three-dimensional (3D) reconstruction. For these applications, dynamic event detection which refers to instantaneously distinguishing measured points of moving objects from measured points of static objects is a fundamental requirement for an agent such as a robot/UAV, a self-driving car, or for an alarming system to detect the moving objects in a scene, predict future states of the moving objects, plan the trajectory of the agent to move accordingly or to avoid the moving objects, or to build consistent 3D maps that exclude the moving objects.

US2020111358A1 discloses a system for detecting dynamic points. For sensors, this reference relies on the input of extra stationary LiDAR, where both vehicle-mounted LiDAR and the extra stationary LiDAR must scan the environments in columns. US2018004227A1 discloses the use of detected moving objects for further processing (e.g., behavior predictions or vehicle motion planning), but does not disclose how the dynamic objects are detected.

BRIEF SUMMARY OF THE INVENTION

There continues to be a need in the art for improved designs and techniques for systems and methods for detecting moving objects and making timely decisions.

Embodiments of the subject invention pertain to a moving object detection system. The system comprises an input module capturing a point cloud comprising measurements of distances to points on one or more objects; and a detection module receiving the point cloud captured by the input module and configured to determine whether the objects are moving objects, by determining whether currently measured points occlude any previously measured points, and/or whether the currently measured points recursively occlude any previously measured points, and/or whether the currently measured points are recursively occluded by any previously measured points. Whether the objects are moving objects is determined either sequentially or simultaneously. The previously measured points of the moving objects are partially or completely excluded in the determination of occlusion for currently measured points. The determination of occlusion is performed based on depth images by comparing the depth of the currently measured points with previously measured ones that are projected to the same or adjacent pixels of the depth image in order to determine the occlusion. Moreover, the points are projected to the depth image by a spherical projection or a perspective projection or a projection that projects points lying on neighboring lines of sight to neighboring pixels. In a moving platform such as a vehicle, a UAV, or any other movable object that carries the sensor and moves in a space, a depth image is attached with a pose read from an external motion sensing module, indicating under which pose the depth image is constructed, and points are configured to be transformed to this pose before projection to the depth image. Each pixel of a depth image is configured to save all or a selected number of points projected therein, and/or all or a select number of the depths of points projected therein, and/or the statistical information comprising a minimum value, a maximum value, or a variance of depths of all or a selected number of points projected therein, and/or other information of the occluded points attached to points projected therein. Furthermore, multiple depth images can be constructed at multiple prior poses, and each is constructed from points starting from the respective pose and accumulated for a certain period of time. Each point in a pixel is configured to save the points in previous depth images that occlude the point or are occluded by the point. The occlusion of current points is determined against all or a selected number of depth images previously constructed. A current point is determined to occlude previous points if its depth is smaller than all or any points contained in adjacent pixels of any depth images it projects to. In addition, a current point can be determined to be occluded by previous points if its depth is larger than all or any points contained in adjacent pixels of any depth images it projects to. A current point can be determined to recursively occlude previous points if it occludes any point in any previous depth image and further occludes any point in any more previous depth image that is occluded by the previous one, for a certain number of times. A current point can be determined to be recursively occluded by previous points if it is occluded by any point in any previous depth image and is further occluded by any point in any more previous depth image that occludes the previous one, for a certain number of times.

According to an embodiment of the subject invention, a method for detecting one or more moving objects is provided. The method comprises capturing, by an input module, a point cloud comprising measurements of distances to points on one or more objects; providing the point cloud captured by the input module to a detection module; and configuring the detection module to determine whether the objects are moving objects, by determining whether currently measured points occlude any previously measured points, and/or whether the currently measured points recursively occlude any previously measured points, and/or whether the currently measured points are recursively occluded by any previously measured points. Moreover, whether the points of current point cloud are of the one or more moving objects is determined either sequentially or simultaneously. The previously measured points of the moving objects are partially or completely excluded in the determination of occlusion for currently measured points. The determination of occlusion is performed based on depth images by comparing depth of the currently measured points with previously measured ones that are projected to same or adjacent pixels of the depth image in order to determine the occlusion. The points are projected to the depth image by a spherical projection or a perspective projection or a projection that projects points lying on neighboring lines of sight to neighboring pixels.

In certain embodiment of the subject invention, a computer-readable storage medium is provided, having stored therein program instructions that, when executed by a processor of a computing system, cause the processor to execute a method for detecting one or more moving objects. The method comprises capturing, by an input module, point cloud comprising measurements of distances to points on one or more objects; providing the point cloud captured by the input module to a detection module; and configuring the detection module to determine whether the objects are moving objects, by determining whether currently measured points occlude any previously measured points, and/or whether the currently measured points recursively occlude any previously measured points, and/or whether the currently measured points are recursively occluded by any previously measured points.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 7 is a schematic representation showing that in the third step of FIG. 5, all current points are used to construct a depth image, according to an embodiment of the subject invention.

FIGS. 8A-8D show images depicting the results of experiments carried out by the moving object detection method and system, according to an embodiment of the subject invention.

DETAILED DISCLOSURE OF THE INVENTION

The embodiments of subject invention show a method and systems for detecting dynamic events from a sequence of point scans measured by ranging detecting devices such as ranging sensors.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification (except for the claims), specify the presence of stated features, steps, operations, elements, and/or components, but do not prelude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention pertains. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

In describing the invention, it will be understood that a number of techniques and steps are disclosed. Each of these has individual benefits and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

The term "ranging direction" used herein refers to a direction along which a ranging sensor measures a distance to a moving object or a stationary object.

Figure 1:
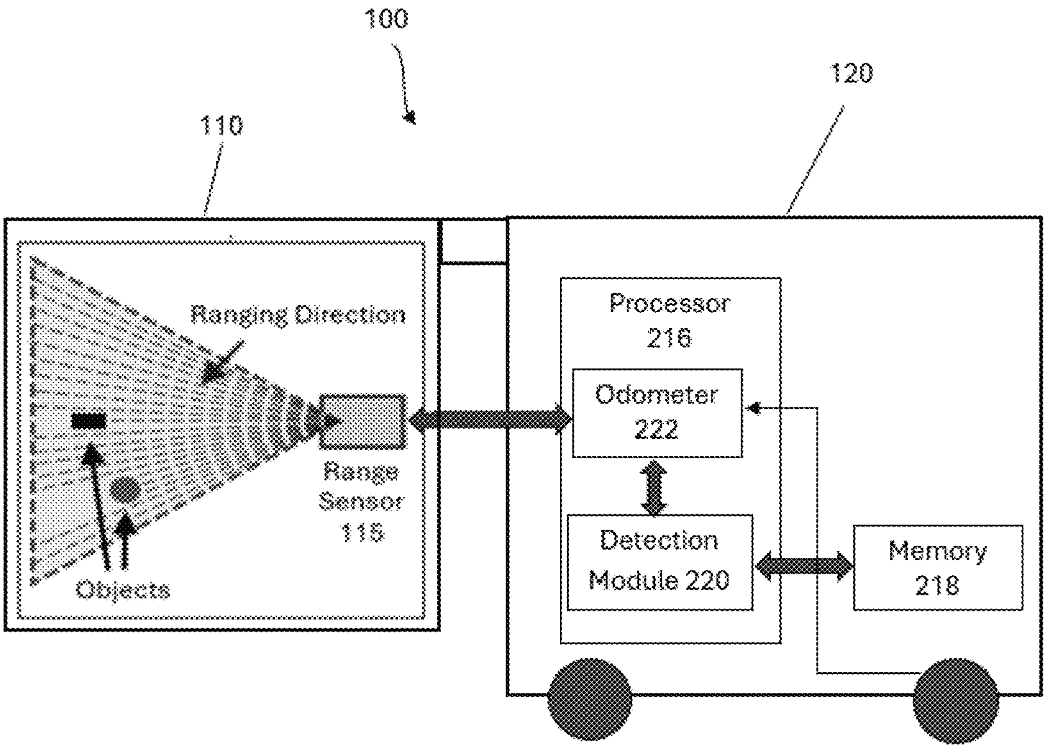
FIG. 1 is a schematic representation of a moving object detection system, according to an embodiment of the subject invention.

Referring to FIG. 1, a moving object detection system 100 comprises a point cloud capture module 110 fastened to a movable platform 120, such as a self-driving vehicle. The point cloud capture module 110 comprises a range sensor 115 that measures the distances to one or more objects along multiple ranging directions simultaneously or in sequence. It may be in the form of a light detection and ranging (LiDAR) sensor, a laser scanner, an ultrasonic sensor, a radar, or any suitable sensor that captures the three-dimensional (3-D) structure of a moving object or a stationary object from the viewpoint of the sensor. The range sensor 115 in the point cloud capture module 110 passes the measured data, i.e. point clouds, to a processor 216 in the platform 120. The processor 216 may be a programmed computer or microcontroller, an application-specific integrated circuit (ASIC), a programable gate array or other analog or digital logic circuit. The processor stores the point clouds in computer-readable storage medium or memory 218. This memory may also contain the instructions for operating the processor 216 to carry out the present invention.

A detection module 220 in processor 218 reads the point cloud data from memory 218 or directly from range sensor 115 and determines whether the points on the objects in the field of view are moving objects by checking whether the data points currently measured occlude any points previously measured, and/or whether the points currently measured recursively occlude any data points previously measured, and/or whether the data points currently measured are recursively occluded by any data points previously measured. The detection module 220 can be programmed to make the determinations based on the points currently measured or previously measured either sequentially or simultaneously. For each current point of the cloud data being processed, the corresponding sensor pose at the measured time, including a translational component and a rotational component, is read from an odometry system or odometer 222 in FIG. 1. This odometry system, which may be a module in processor 216 measures the position change of the range sensor 115 over time in 3D space and thus calculates the odometry for the platforms (such as cars or UAVs). Additional data from other sensors, such as wheel speed sensors can also be provided to the odometry module 222 as shown in FIG. 1 for odometry calculations.

Figure 2:
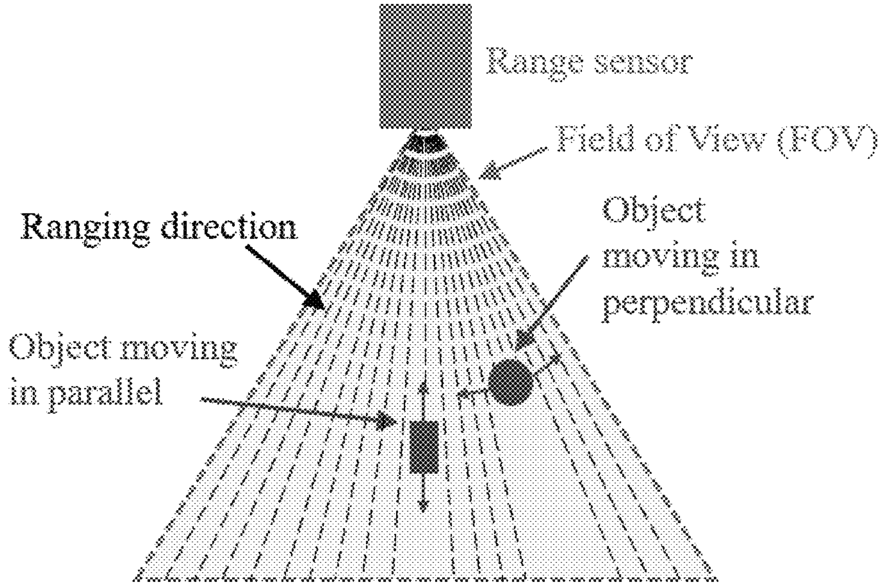
FIG. 2 is a schematic representation of the processes of a ranging sensor of the moving object detection system measuring the distances to one or more objects along multiple ranging directions simultaneously or in sequential, when the one or more objects move perpendicularly to the ranging directions or in parallel with the ranging directions, according to an embodiment of the subject invention.

Referring to FIG. 2, the ranging sensor 115 can be configured to measure the distances to one or more objects along multiple ranging directions simultaneously or in sequential. Each measured point obtained by the ranging sensor may be labelled as a dynamic event (a point on a moving object) or not a dynamic event (a point on a stationary object).

The one or more objects may move perpendicularly to the ranging directions, or move in parallel with the ranging directions, or move in a direction that can be broken into two directions including a first direction perpendicular to the ranging direction and a second direction parallel to the ranging direction.

In one embodiment, the ranging sensor measures the distances to an object in a field of view (FoV) in one ranging direction or multiple ranging directions.

In one embodiment, the ranging sensor can be one of a light detection and ranging (LiDAR) sensor, a laser scanner, an ultrasonic sensor, a radar, or any suitable sensor that captures the three-dimensional (3-D) structure of a moving object or a stationary object from the viewpoint of the sensor. The ranging sensor can be used in a variety of applications, such as robot/unmanned aerial vehicles (UAVs) navigation, autonomous driving, environment monitoring, traffic monitoring, surveillance, and 3D reconstruction.

The moving object detection system and method of the subject invention may instantaneously detect data points of the moving objects, referred to as dynamic event points, by determining the occlusion between current position of the dynamic event points and all or a selected number of previous positions of the dynamic event points based on two fundamental principles of physics.

The first principle is that an object, when moving perpendicular to the ranging direction, partially or wholly occludes the background objects that have been previously detected by the moving object detection system and method.

Figure 3A:
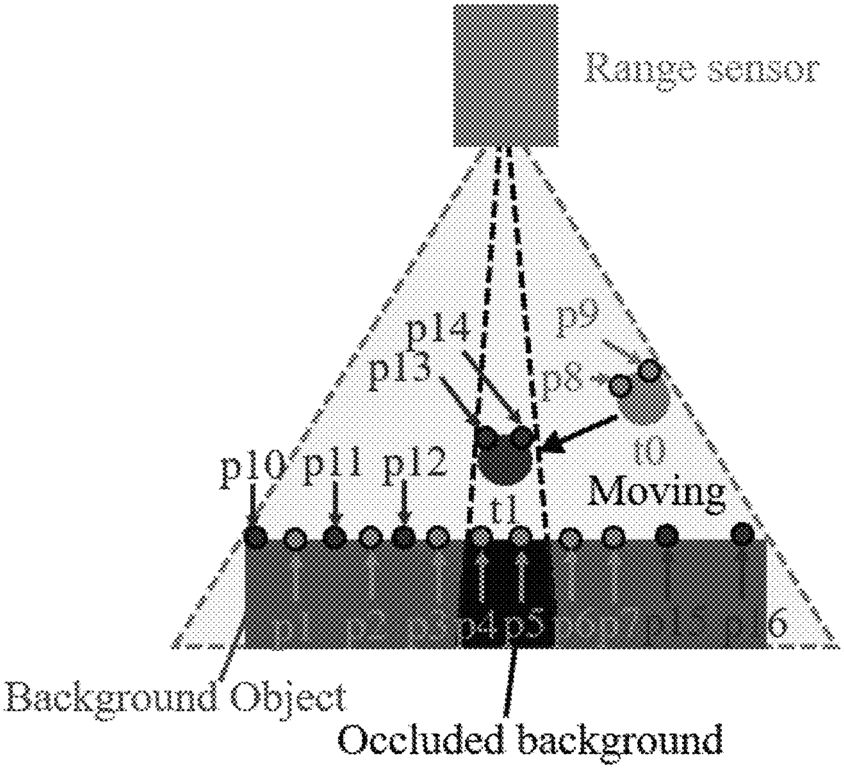
FIG. 3A is a schematic representation of a first occlusion principle for detecting an object moving perpendicularly to a ranging direction from a previous time point t0 to a current time point t1, according to an embodiment of the subject invention.

FIG. 3A illustrates the first principle with greater detail. When an object moves from the previous time point t0 to the current time point t1, measurements obtained by the moving object detection system and method at the previous time point to are designated to be points p1-p9, and at the current time point t1 to be points p10-p16. Due to the movements of the object, the object at the time points p13-p14 of the current time t1 will occlude (hide from the view of the range sensor) the previous points p4-p5 in the background, which were detectable and measured by the moving object detection system and method at the previous time point t0. In contrast, the rest points at t1 that are not on the moving objects do not occlude any previous points p1-p9.

Figure 3B:
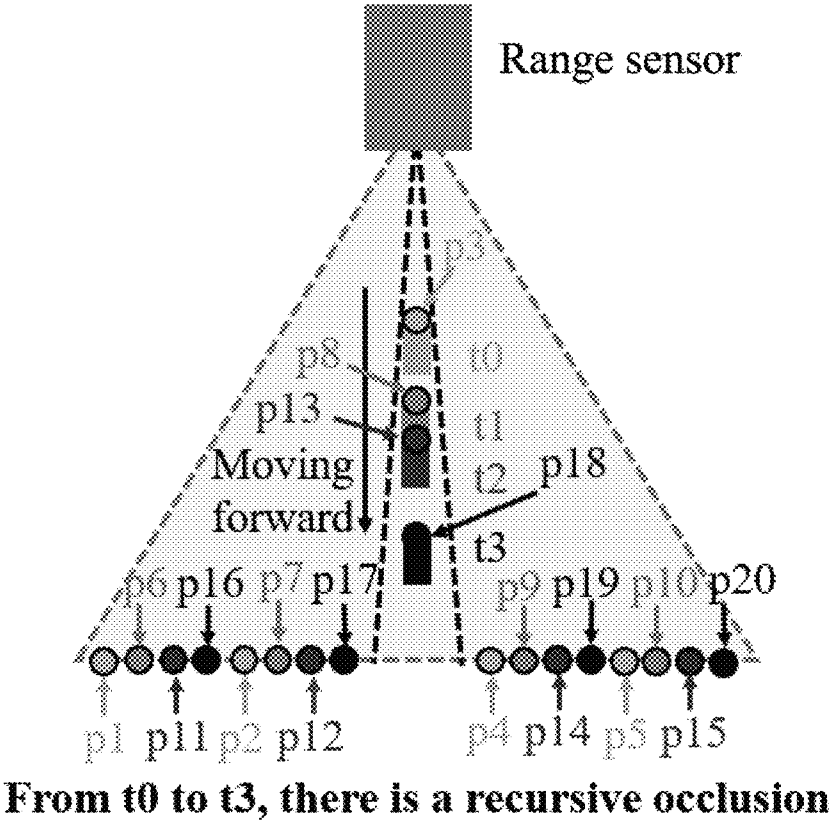
FIG. 3B is a schematic representation of a second occlusion principle for detecting an object moving in parallel with a ranging direction, according to an embodiment of the subject invention.

The second principle is that an object, when moving parallel to the ranging direction, occludes or can be occluded by itself repeatedly. This second occlusion principle is necessary to form a complete moving objects detection method, since the first occlusion principle can only detect objects that are moving crossing the laser ranging direction, but not along the ranging direction FIG. 3B illustrates the second principle with greater detail. In this case, an object is moving away from the moving object detection system and away from previous time point t0 to the current time point t3. The sensor measurements are p1-p5 for time point t0, p6-p10 for time point t1, p11-p15 for time t2, and p16-p20 for time point t3. It is noted that p18 at the current time t3 is occluded by previous points that are further occluded by themselves recursively. In other words, p18 is occluded by p13 (at t2), p8 (at t1), and p3 (at t0), where p13 is occluded by p8 and p3, and p8 is occluded by p3.

On the other hand, when the object is moving towards the sensor in parallel with the ranging direction, the phenomenon is identical except that the corresponding point occludes other point(s) instead of being occluded by other point(s). That being said, a point on the mentioned moving object would occlude previous points that further occlude themselves recursively. It should be noted that applying this phenomenon to moving object detection from LiDAR point clouds is not disclosed by any prior art.

It is also noted that for both the first and the second principles, a point can be determined that, whether it recursively occludes the previous points or is recursively occluded by the previous points, once it is generated it enables instantaneous detection of the moving objects at the point measuring rates.

The main challenge of the present invention resides in the large number of previous points, which are hard to be processed in real-time. To address such challenges, the invention has several novel features. First, depth images are used to store the previous points to ensure efficient occlusion checking (which is the foundation of the occlusion principles). Currently measured points are projected into depth images to perform occlusion checks with points in their neighboring pixels. This makes the occlusion check more efficient. Second, only a certain number of depth images containing previous points are saved for occlusion checking. This limits the number of depth images for occlusion checking and hence limits the processing time.

In one embodiment, determination of the occlusion between current time points and the previous time points can be implemented by depth images. In particular, the determination of the occlusions is performed based on depth images by comparing the depth of the current points and previous ones that are projected to the same or adjacent pixels of the depth image to determine their occlusions.

Figure 4:
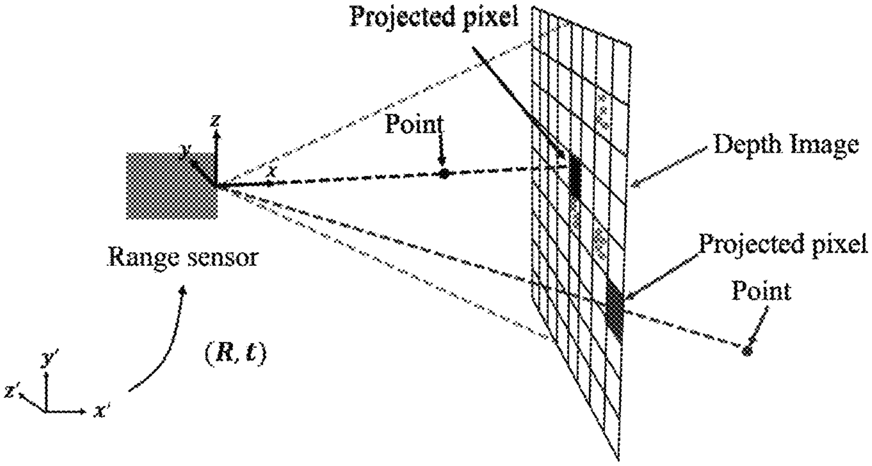
FIG. 4 is a schematic representation of a depth image containing one or many points for each pixel, to which the points project, according to an embodiment of the subject invention.

As shown in FIG. 4, a depth image may be arranged in the form of a two-dimensional array, where for each location such as a pixel, the depth of all or a selected number of points that are projected to the reception field of this pixel is saved.

A depth image can be attached with a pose (referred to as the depth image pose) with respect to a reference frame (referred to as the reference frame x', −y', −z'), indicating where the depth image is constructed.

When (R, t) is defined as the depth image pose and p is defined as the coordinates of a point (either the current point or any previous points) in the same reference frame, a projection of the point to the depth image can be achieved by following steps.

First, the point is transformed into depth image pose by Equation (1)

$$q = R^{-1}(p - t), \tag{1}$$

Then, the transformed point is projected to the depth image as shown by Equations (2) and (3)

$$\theta = a\tan 2\left(q_y, sqrt\left(q_z^2 + q_x^2\right)\right), \tag{2}$$

$$\varphi = a\tan 2(q_z, q_x), \tag{3}$$

where a projection such as perspective projection can be used.

Finally, the pixel location of the projected point location is determined by Equations (4) and (5)

$$\Theta_l = \left[(\theta + \pi)/d\right], \tag{4}$$

$$\varphi_l = \left[(\varphi + \pi)/d\right], \tag{5}$$

where d is the pixel size which is the resolution of the depth image.

In one embodiment, the points are projected to the depth image by a spherical projection, a perspective projection, or any other suitable project that projects points lying on neighboring lines of sight to neighboring pixels.

In one embodiment, in a moving platform, a depth image is attached with a pose read from an external motion sensing device such as an odometry module, indicating under which pose the depth image is constructed and points are configured to be transformed to this pose before the projection to the depth image.

In one embodiment, each pixel of a depth image saves all or a selected number of points projected therein, and/or all or a select number of the depths of points projected therein, and/or the statistical information, for example, the minimum value, the maximum value, or the variance, of depths of all or a selected number of points projected therein, and/or the occluded points' other information attached to points projected therein.

In one embodiment, depth images are constructed at multiple prior poses and each depth image is constructed from points starting from the respective pose and accumulating for a certain period. Moreover, each point in a pixel saves the points in previous depth images that occlude the point or are occluded by the point.

In one embodiment, the occlusion of current points is determined against all or a selected number of depth images previously constructed.

In one embodiment, a current point is considered as occluding previous points if its depth is smaller than all or any points contained in adjacent pixels of any depth images it projects to.

In one embodiment, a current point is considered to be occluded by the previous points if its depth is larger than all or any points contained in adjacent pixels of any depth images it projects to.

In one embodiment, the occlusion of the current point and points in a depth image could be rejected or corrected by additional tests, for example, depending on if the current point is too close to points in the depth image.

In one embodiment, a current point is considered to recursively occlude previous points if it occludes a set of points in previous depth images, and in the set, points in later depth images are occluded by points in earlier depth images.

In one embodiment, a current point is considered to be recursively occluded by the previous points if it is occluded by a set of points in previous depth images, and in the set, points in later depth images are occluded by points in earlier depth images.

The depth image can be implemented with a fixed resolution as shown above or with multiple resolutions, the depth image can be implemented as a two-dimensional array or other types of data structure such that the pixel locations of previous points can be organized more efficiently.

Figure 5:
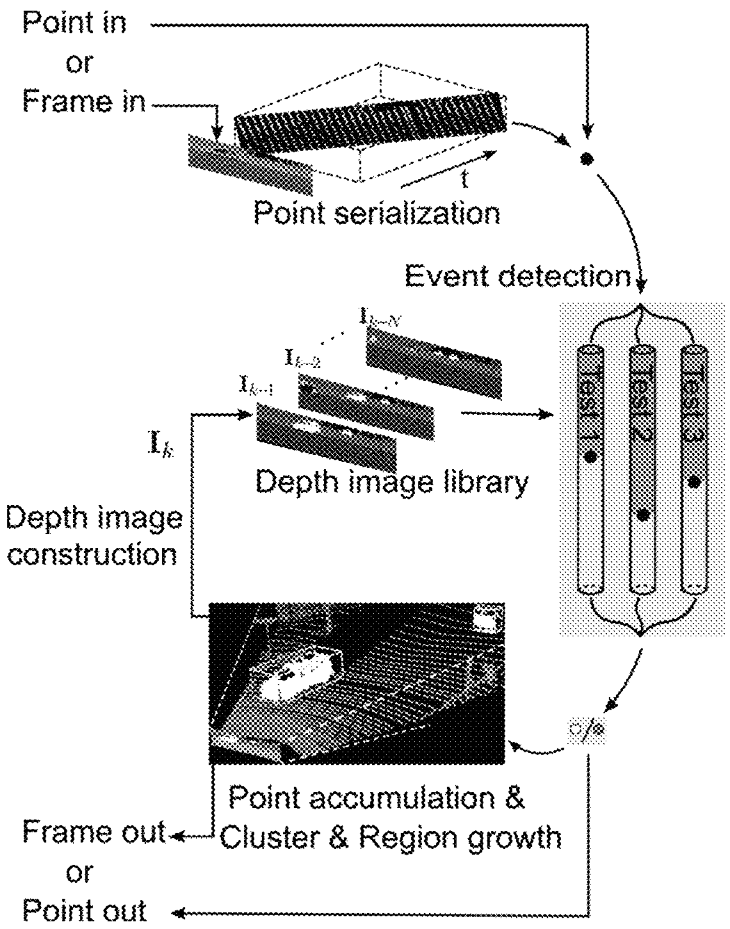
FIG. 5 shows a flow chart of a three-step method for implementing the two occlusion principles based on the depth images, according to an embodiment of the subject invention.

Referring to FIG. 5, the two occlusion principles described above can be implemented by an embodiment of a three-step method based on the depth images, after an initialization of a certain number of depth images. In particular, the first step is performed for dynamic event point detection, the second step is performed for point accumulation, and the third step is performed for depth image construction.

In the first step, a current point can be individually processed immediately after it is received or a group of points can form a batch by being accumulated over a certain period of time, for example, 50 Hz per frame. For each current point being processed, the corresponding sensor pose at the measured time, including a translational component and a rotational component, is read from an external odometry system or odometer 222 in FIG. 1. This odometry system, which may be a module in processor 216 measures the position change of the range sensor 115 over time in 3D space. The point cloud data is provided to odometer 222 from range sensor 115, which calculates the odometry for the platforms (such as cars or UAVs). Additional data from other sensors, such as wheel speed sensors can also be provided to the odometry module 222 as shown in FIG. 1 for odometry calculations. is then projected to a selected set of depth images constructed by Equations (1)-(5) at 52 by processor 216 according to the corresponding pose at which the point cloud is measured. Next, all the points contained in the projected pixel are extracted and three concurrent tests 54 are performed as described with greater details below. If any of these points are tested to be positive, the point(s) are determined as dynamic event points that are points on moving objects and can be sent out to other modules 56 such as an alarming system for the agent to timely respond. If the test results are all negative, the point(s) are determined not to be a dynamic event point and thus is on a stationary object and can be sent out to external modules such as a mapping module for other applications.

Figure 6:
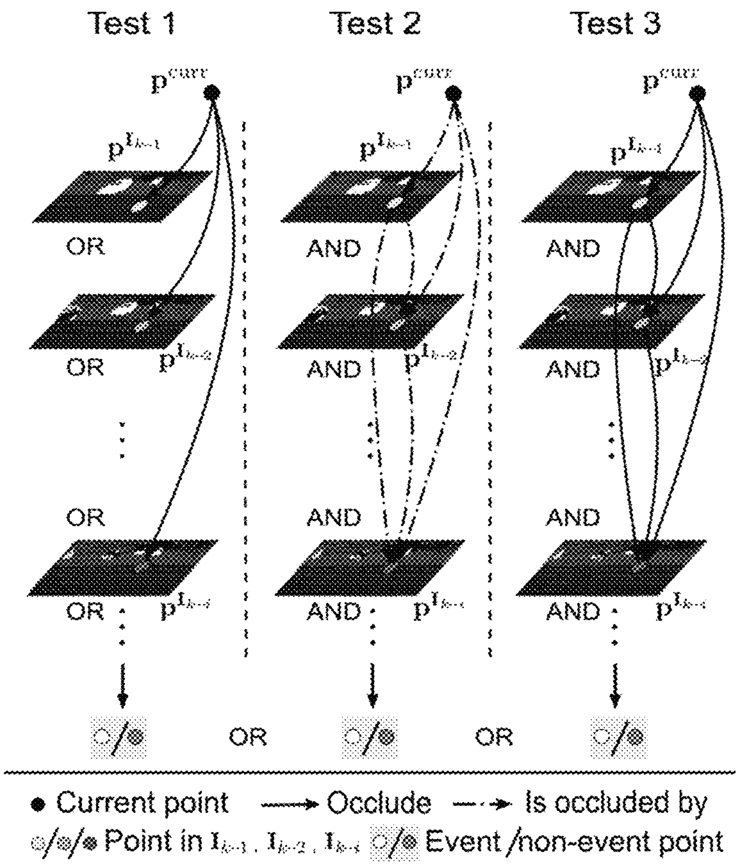
FIG. 6 shows flow charts of the steps of the tests 1-3 of FIG. 5, according to an embodiment of the subject invention.

Referring to Test 1 of FIG. 6, the first test of FIG. 5 is performed to detect points on moving objects with motions perpendicular to the ranging direction of the ranging sensor. In particular, if the point occludes any point $p^{I_{k-i}}$ in the i-th previous depth image for a given set (e.g., i=1, 2, . . . $M_1$), for example, by comparing the depth of the point with that contained in the projected pixel (and/or neighboring pixels) of the respective depth image, the point is classified as a dynamic event point.

Referring to Test 2 of FIG. 6, the second test of FIG. 5 is performed to determine whether the points on the objects move away from the sensor and in parallel with the ranging direction of the ranging sensor.

In particular, if the current point is occluded by any points in a selected set of previous depth image (e.g., denoted by $p^{I_{k-i}}$, i=1, 2, . . . , $M_2$), for example, by comparing the depth of the point with that contained in the projected pixel (and/or neighboring pixels), and further the set of points are occluded by themselves recursively (e.g., $p^{I_{k-i}}$ is occluded by $p^{I_{k-j}}$ for all or a select set of i and j>i), then the point is classified as a dynamic event point.

Referring to Test 3 of FIG. 6, the third test of FIG. 5 is performed to determine whether points of the objects move towards the ranging sensor and in parallel with the ranging direction of the ranging sensor.

In particular, if the current point occludes any points in a selected set of previous depth image (e.g., denoted by $p^{I_{k-i}}$, i=1, 2, . . . , $M_2$) (for example, by comparing the depth of the point with that contained in the projected pixel and/or the neighboring pixels), and further the set of points occlude themselves recursively (e.g., $p^{I_{k-i}}$ occludes $p^{I_{k-j}}$ for all or a select set of i and j>i), then the point is classified as a dynamic event point.

Referring back to FIG. 5, in the second step, the current points are accumulated over a certain time period (e.g., 100 ms) 56. The accumulated points form a frame, where further processing, such as clustering and region growth could be performed to accept further dynamic event points or reject any false dynamic event points.

Referring to FIG. 7, in the third step of FIG. 5, all current points are used to construct a depth image 52. Given the current time $t_{current}$, to ensure that the depth image is properly populated with projected points, all points that follow in a certain period from $t_{current}$ are saved to the same depth image. The pose attached to the depth image can be read from an external odometry module or system that estimates the sensor ego-motion. The current depth image, along with depth images in the past, are used for the determination of future points. When the points contained in each pixel of the depth image are determined to be moving, certain properties can be determined, such as with which criterion it is tested, and/or all or any points and the associated depth image and pixel location it occludes, and/or all or any points and the associated depth image and pixel location occluded by it. These properties can be applied to the first step to improve the performance of the moving object detection system and method.

The moving object detection method and system of the subject invention can instantaneously distinguish points of the moving objects from the points of stationary objects measured by the ranging devices. Based on this point-level detection, moving objects in a detected scene can be robustly and accurately recognized and tracked, which is essential for an agent such as a robot/UAV, a self-driving car, or an alarming system to react or respond to the moving objects.

FIGS. 8A-8D show images exemplifying the results of experiments conducted with the moving object detection system and method of the present invention. Boxes in the main part of the image denote points of moving objects segmented by the moving object detection system and method, boxes in the inserts in FIGS. 8A, 8B and 8D are current points, and shaded points are previous points constituting depth images.

In particular, FIG. 8A shows an outdoor experiment using a Livox AVIA which is an emerging hybrid-state LiDAR. In FIG. 8A, the stationary LiDAR detects different objects, including two cars (objects 1 and 2), a motorcycle (object 3), and a pedestrian beside a streetlamp (object 4).

FIG. 8B shows an indoor experiment using Livox AVIA LiDAR carried by an unmanned aerial vehicle (UAV). The LiDAR moves together with the UAV and detects multiple tennis balls such as objects 1 and 2.

FIG. 8C shows an outdoor experiment using an Ouster OS1-128 which is a multi-line spinning LiDAR. The moving LiDAR detects a number of pedestrians.

FIG. 8D shows KITTI Autonomous car dataset using a Velodyne HDL-64E LiDAR, which is a multi-line spinning LIDAR. Two preceding moving cars are detected when it appears in the field of view (FOV) of the LiDAR.

The computational efficiencies of the various experiments performed by the moving object detection system and method are shown in Table 1 below. A detection latency smaller than 0.5 μs can be achieved.

TABLE 1

Computational Efficiencies of the Moving Object Detection System and Method with Various Types of LiDAR

| LiDAR Type | Livox AVIA | Velodyne HDL-32E | Velodyne HDL-64E |
|---|---|---|---|
| Points per second | 240,000 | 800,000 | 1,330,000 |
| Detection time per point | 1.7 μs | 2.3 μs | 3.8 μs |

Due to the limited sensor resolution, the occlusion principles may lead to many false positive points (i.e., points not on moving objects are detected as on moving objects). To address this problem, a false positive rejection (FPR) step, following the occlusion check step, can be applied to each dynamic event points. This step aims to reject incorrect event points according to the principle that a point on the moving object should be distant from stationary map points. Since one depth image contains only a part of the map points, a map consistency check is performed on multiple recent depth images. Specifically, after the occlusion check, all non-event points are retrieved in the pixel where the current point is projected and in neighboring pixels. For any retrieved point, if there exists a point with a similar depth to that of the current point, the current point is considered as a stationary point and the dynamic event point should be revised as a non-event one.

The embodiments of the moving object detection system and method of the subject invention provide many advantages.

First, the embodiments are robust for detecting dynamic events of moving objects of different types, shapes, sizes, and speeds, such as moving vehicles, pedestrians, and cyclists in the application of autonomous driving and traffic monitoring, or any intruders in the application of security surveillance, or general objects such as human or animal on the ground, birds in air, and other man-made or natural objects in the application of UAV navigations.

Second, the embodiments are adaptable for working with different types of ranging sensors including, but not limited to, conventional multi-line spinning LiDARs, emerging solid-state or hybrid LiDARs, 3D laser scanners, radars, or other suitable ranging sensors, even when the ranging sensor itself is moving.

Third, the embodiments are highly efficient and can run at high point measuring rates, for example a few tens of thousands of Hertz when running on embedded low-power computers.

Fourth, the embodiments can achieve a low latency for determining whether a point is a dynamic event immediately after the measurement of the point is conducted. For example, the latency between the measurement of a point on any moving object and the determination can be less than one microsecond.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

EMBODIMENTS

Embodiment 1. A moving object detection system, comprising:

- an input module configured to capture a point cloud comprising measurements of distances to points on one or more objects; and
- a detection module configured to receive the point cloud captured by the input module and configured to determine whether the objects are moving objects, by determining whether currently measured points occlude any previously measured points, and/or whether the currently measured points recursively occlude any previously measured points, and/or whether the currently measured points are recursively occluded by any previously measured points.

Embodiment 2. The moving object detection system of embodiment 1, wherein whether the objects are moving objects is determined either sequentially or simultaneously, with the system being used configured with other processing steps and modules for performance enhancements.

Embodiment 3. The moving object detection system of embodiment 1, wherein the previously measured points of the moving objects are partially, or completely excluded in the determination of occlusion for currently measured points.

Embodiment 4. The moving object detection system of embodiment 1, wherein the determination of occlusion is performed based on a depth image by comparing the depth of the currently measured points with previously measured ones that are projected to same or adjacent pixels of the depth image to determine the occlusion, with the occlusion results being corrected by additional tests for performance enhancements.

Embodiment 5. The moving object detection system of embodiment 4, wherein the points are projected to the depth image by a spherical projection, a perspective projection, or a projection that projects points lying on neighboring lines of sight to neighboring pixels.

Embodiment 6. The moving object detection system of embodiment 5, wherein in a moving platform, the depth image is attached with a pose read from an external motion sensing module, indicating under which pose the depth image is constructed and points are configured to be transformed to this pose before projection to the depth image.

Embodiment 7. The moving object detection system of embodiment 5, wherein for each pixel of the depth image, the detection module is configured to save all or a selected number of points projected therein, and/or all or a select number of the depths of points projected therein, and/or the statistical information comprising a minimum value, a maximum value, or a variance of depths of all or a selected number of points projected therein, and/or other information of the occluded points attached to points projected therein.

Embodiment 8. The moving object detection system of embodiment 5, wherein multiple depth images are constructed at multiple prior poses, and each is constructed from points starting from the respective pose and accumulating for a certain period of time.

Embodiment 9. The moving object detection system of embodiment 8, wherein for each point of a pixel, the detection module is configured to save the points in a previous depth image that occlude the point or are occluded by the point.

Embodiment 10. The moving object detection system of embodiment 8, wherein the occlusion of current points is determined against all or a selected number of depth images previously constructed.

Embodiment 11. The moving object detection system of embodiment 10, wherein a current point is determined to occlude previous points if its depth is smaller than all or any points contained in adjacent pixels of any depth image to which it projects.

Embodiment 12. The moving object detection system of embodiment 10, wherein a current point is determined to be occluded by previous points if its depth is greater than all or any points contained in adjacent pixels of any depth image to which it projects.

Embodiment 13. The moving object detection system of embodiment 11, wherein a current point is determined to recursively occlude previous points if it occludes a set of points in previous depth images and in the set, points in later depth images occlude points in earlier depth images.

Embodiment 14. The moving object detection system of embodiment 12, wherein a current point is determined to be recursively occluded by previous points if it is occluded by a set of points in previous depth image and in the set, points in later depth images are occluded by points in earlier depth images.

Embodiment 15. A method for detecting one or more moving objects, the method comprising:

- capturing, by an input module, a point cloud comprising measurements of distances to points on one or more objects;
- providing the point cloud captured by the input module to a detection module; and
- configuring the detection module to determine whether the objects are moving objects, by determining whether currently measured points occlude any previously measured points, and/or whether the currently measured points recursively occlude any previously measured points, and/or whether the currently measured points are recursively occluded by any previously measured points.

Embodiment 16. The method of embodiment 15, wherein whether the objects are moving objects is determined either sequentially or simultaneously, with the system method being used configured with other processing steps for performance enhancements.

Embodiment 17. The method of embodiment 15, wherein the previously measured points of the moving objects are partially or completely excluded in the determination of occlusion for currently measured points.

Embodiment 18. The method of embodiment 15, wherein the determination of occlusion is performed based on a depth image by comparing the depth of the currently measured points with previously measured ones that project to same or adjacent pixels of the depth image to determine the occlusion, with the occlusion results being corrected by additional tests for performance enhancements.

Embodiment 19. The method of embodiment 18, wherein the points are projected to the depth image by a spherical projection, a perspective projection, or a projection that projects points lying on neighboring lines of sight to neighboring pixels.

Embodiment 20. The method of embodiment 19, wherein in a moving platform, the depth image is attached with a pose read from an external motion sensing module, indicating under which pose the depth image is constructed and points are configured to be transformed to this pose before projection to the depth image.

Embodiment 21. The method of embodiment 19, wherein for each pixel of the depth image, the detection module is configured to save all or a selected number of points projected therein, and/or all or a select number of the depths of points projected therein, and/or the statistical information comprising a minimum value, a maximum value, or a variance of depths of all or a selected number of points projected therein, and/or other information of the occluded points attached to points projected therein.

Embodiment 22. The method of embodiment 19, wherein multiple depth images are constructed at multiple prior poses, and each is constructed from points starting from the respective pose and accumulating for a certain period of time.

Embodiment 23. The method of embodiment 22, wherein for each point of a pixel, the detection module is configured to save the points in a previous depth image that occludes the point or are occluded by the point.

Embodiment 24. The method of embodiment 22, wherein the occlusion of current points is determined against all or a selected number of depth images previously constructed.

Embodiment 25. The method of embodiment 24, wherein a current point is determined to occlude previous points if its depth is smaller than all or any points contained in adjacent pixels of any depth image to which it projects.

Embodiment 26. The method of embodiment 24, wherein a current point is determined to be occluded by previous points if its depth is greater than all or any points contained in adjacent pixels of any depth image to which it projects.

Embodiment 27. The method of embodiment 25, wherein a current point is determined to recursively occlude previous points if it occludes a set of points in previous depth images and in the set, points in later depth images occlude points in earlier depth images.

Embodiment 28. The method of embodiment 26, wherein a current point is determined to be recursively occluded by previous points if it is occluded by a set of points in previous depth image and in the set, points in later depth images are occluded by points in earlier depth images.

Embodiment 29. A computer-readable storage medium having stored therein program instructions that, when executed by a processor of a computing system, cause the processor to execute a method for detecting one or more moving objects, the method comprising:

capturing, by an input module, a point cloud comprising measurements of distances to points on one or more objects;

providing the point cloud captured by the input module to a detection module; and configuring the detection module to determine whether the objects are moving objects, by determining whether currently measured points occlude any previously measured points, and/or whether the currently measured points recursively occlude any previously measured points, and/or whether the currently measured points are recursively occluded by any previously measured points.

REFERENCES

[1] R. Kummerle, M. Ruhnke, B. Steder, C. Stachniss, and W. Burgard, "A navigation system for robots operating in crowded urban environments," in 2013 IEEE International Conference on Robotics and Automation. IEEE, 2013, pp. 3225-3232.

[2] A. Dewan, T. Caselitz, G. D. Tipaldi, and W. Burgard, "Motion-based detection and tracking in 3d lidar scans," in 2016 IEEE international conference on robotics and automation (ICRA). IEEE, 2016, pp. 4508-4513.

[3] A. Dewan, T. Caselitz, G. D. Tipaldi, and W. Burgard, "Rigid scene flow for 3d lidar scans," in 2016 IEEE/RSJ International Conference on Intelli-gent Robots and Systems (IROS). IEEE, 2016, pp. 1765-1770.

[4] X. Chen, A. Milioto, E. Palazzolo, P. Giguere, J. Behley, and C. Stachniss, "Suma++: Efficient lidar-based semantic slam," in 2019 IEEE/RSJ International Conference on Intelligent Robots and Systems (IROS). IEEE, 2019, pp. 4530-4537.

[5] D. Yoon, T. Tang, and T. Barfoot, "Mapless online detection of dynamic objects in 3d lidar," in 2019 16th Conference on Computer and Robot Vision (CRV). IEEE, 2019, pp. 113-120.

[6] T.-D. Vu, J. Burlet, and O. Aycard, "Grid-based localization and online mapping with moving objects detection and tracking: new results," in 2008 IEEE Intelligent Vehicles Symposium. IEEE, 2008, pp. 684-689.

[7] W. Xiao, B. Vallet, M. Bredif and N. Paparoditis, "Street environment change detection from mobile laser scanning point clouds," ISPRS Journal of Photogrammetry and Remote Sensing, vol. 107, pp. 38-49, 2015.

[8] A. Asvadi, C. Premebida, P. Peixoto, and U. Nunes, "3d lidar-based static and moving obstacle detection in driving environments: An approach based on voxels and multi-region ground planes," Robotics and Autonomous Systems, vol. 83, pp. 299-311, 2016.

[9] J. Schauer and A. Nuchter, "The people remover—removing dynamic objects from 3-d point cloud data by traversing a voxel occupancy grid," IEEE robotics and automation letters, vol. 3, no. 3, pp. 1679-1686, 2018.

[10] P. Pfreundschuh, H. F. C. Hendrikx, V. Reijgwart, R. Dub ,e, R. Siegwart, and A. Cramariuc, "Dynamic object aware lidar slam based on automatic generation of training data," arXiv preprint arXiv:2104.03657, 2021.

[11] J. Gehrung, M. Hebel, M. Arens, and U. Stilla. An approach to extract moving objects from mls data using a volumetric background representation. ISPRS Annals of the Photogrammetry, Remote Sensing and Spatial Information Sciences, 4, 2017.

[12] S. Pagad, D. Agarwal, S. Narayanan, K. Rangan, H. Kim, and G. Yalla. Robust Method for Removing Dynamic Objects from Point Clouds. In Proc. of the IEEE Intl. Conf. on Robotics & Automation, 2020.

[13] F. Moosmann and C. Stiller, "Joint self-localization and tracking of generic objects in 3d range data," in 2013

IEEE International Conference on Robotics and Automation. IEEE, 2013, pp. 1146-1152.
[14] R. Dub ,e, A. Cramariuc, D. Dugas, J. Nieto, R. Siegwart, and C. Cadena, "Segmap: 3d segment mapping using data-driven descriptors," arXiv preprint arXiv: 1804.09557, 2018.
[15] P. Biasutti, V. Lepetit, J.-F. Aujol, M. Br ,edif, and A. Bugeau, "Lu-net: An efficient network for 3d lidar point cloud semantic segmentation based on end-to-end-learned 3d features and u-net, in Proceedings of the IEEE/CVF International Conference on Computer Vision Workshops, 2019, pp. 0-0.
[16] I. Alonso, L. Riazuelo, L. Montesano, and A. C. Murillo, "3d-mininet: Learning a 2d representation from point clouds for fast and efficient 3d lidar semantic segmentation," IEEE Robotics and Automation Letters, vol. 5, no. 4, pp. 5432-5439, 2020.
[17] A. Dewan, G. L. Oliveira, and W. Burgard, "Deep semantic classification for 3d lidar data," in 2017 IEEE/RSJ International Conference on Intelligent Robots and Systems (IROS). IEEE, 2017, pp. 3544-3549.
[18] Z. Zhao, W. Zhang, J. Gu, J. Yang, and K. Huang, "Lidar mapping optimization based on lightweight semantic segmentation," IEEE Transactions on Intelligent Vehicles, vol. 4, no. 3, pp. 353-362, 2019.
[19] D. Z. Wang, I. Posner, and P. Newman. What could move? finding cars, pedestrians and bicyclists in 3d laser data. In Proc. of the IEEE Intl. Conf. on Robotics & Automation, 2012.
[20] P. Ruchti and W. Burgard. Mapping with dynamic-object probabilities calculated from single 3d range scans. In Proc. of the IEEE Intl. Conf. on Robotics & Automation, 2018.
[21] T. Cortinhal, G. Tzelepis, and E. E. Aksoy. SalsaNext: Fast, Uncertainty-Aware Semantic Segmentation of LiDAR Point Clouds. In Proc. of the IEEE Vehicles Symposium (IV), 2020.
[22] S. Li, X. Chen, Y. Liu, D. Dai, C. Stachniss, and J. Gall. Multi-scale interaction for real-time lidar data segmentation on an embedded platform. arXiv preprint arXiv: 2OO8.O9J62, 2020.
[23] A. Milioto, I. Vizzo, J. Behley, and C. Stachniss. RangeNet++: Fast and Accurate LiDAR Semantic Segmentation. In Proc. of the IEEE/RSJ Intl. Conf. on Intelligent Robots and Systems, 2019.
[24] H. Thomas, C. Qi, J. Deschaud, B. Marcotegui, F. Goulette, and L. Guibas. KPConv: Flexible and Deformable Convolution for Point Clouds. In Proc. of the IEEE/CVF Intl. Conf. on Computer Vision, 2019.
[25] X. Chen, S. Li, B. Mersch, L. Wiesmann, J. Gall, J. Behley, and C. Stachniss. "Moving Object Segmentation in 3D LiDAR data: A learning-based Approach Exploiting Sequential Data." arXiv preprint arXiv:2JO5.O897J.
[26] J. P. Underwood, D. Gillsj •o, T. Bailey, and V. Vlaskine, "Explicit 3d change detection using ray-tracing in spherical coordinates," in 2013 IEEE international conference on robotics and automation. IEEE, 2013, pp. 4735-4741.

The invention claimed is:

1. A moving object detection system, comprising:

an input module configured to capture measurements of distances to points on one or more objects, and optionally create a point cloud therefrom;

a detection module configured to receive the measurements directly or from the point cloud and configured to determine whether the objects are moving objects by tests determining (1) whether currently measured points occlude any previously measured points, (2) whether the currently measured points recursively occlude any previously measured points, and (3) whether the currently measured points are recursively occluded by any previously measured points, and where any positive result of the tests indicates a moving object and all negative results indicate a static object;

wherein the determination of occlusion is performed based on a depth image by comparing the depth of the currently measured points with previously measured ones that project to the same or adjacent pixels of the depth image;

wherein the occlusion results are corrected by an additional false positive rejection (FPR) test based on the principle that a point on the moving object should be distant from stationary map points, said FRP test following the occlusion determination and comprising the steps of:

performing a map consistency check on multiple recent depth images by retrieving all non-event points in the pixel where the current point is projected and in neighboring pixels, for any retrieved point, if there exists a point with a similar depth to that of the current point, considering it a stationary point, and revising the dynamic event point to be a non-event one, whereby false positives are removed; and controlling the movement of a vehicle on the basis of the object detection.

2. The moving object detection system of claim 1, wherein the tests on points to determine whether they are on moving objects are conducted either sequentially or simultaneously, the system being configured with other processing modules for performance enhancements.

3. The moving object detection system of claim 1, wherein the previously measured points of the moving objects are at least partially excluded in the determination of occlusion for currently measured points.

4. The moving object detection system of claim 1, wherein the points are projected to the depth image by one of a spherical projection, a perspective projection, or a projection that projects points lying on neighboring lines of sight to neighboring pixels.

5. The moving object detection system of claim 4, wherein in a moving platform, the depth image is attached to a pose read from an external motion sensing module, indicating under which pose the depth image is constructed, and wherein points are configured to be transformed to this pose before projection to the depth image.

6. The moving object detection system of claim 4, wherein for each pixel of the depth image, the detection module is configured to save at least a selected number of points projected therein, and/or at least a select number of the depths of points projected therein, and/or the statistical information comprising a minimum value, a maximum value, or a variance of depths of at least a selected number of points projected therein, and/or other information of the occluded points attached to points projected therein.

7. The moving object detection system of claim 4, wherein multiple depth images are constructed at multiple prior poses, and each is constructed from points starting from the respective pose and accumulated for a certain period of time.

8. The moving object detection system of claim 7, wherein for each point of a pixel, the detection module is configured to save all points in a previous depth image that are located on either dynamic or static objects, whether they occlude the point or are occluded by the point.

9. The moving object detection system of claim 7, wherein the occlusion of current points is determined against at least a selected number of depth images previously constructed.

10. The moving object detection system of claim 9, wherein a current point is determined to occlude previous points if its depth is smaller than any points contained in adjacent pixels of any depth image to which it projects.

11. The moving object detection system of claim 9, wherein a current point is determined to be occluded by previous points if its depth is greater than any points contained in adjacent pixels of any depth image to which it projects.

12. The moving object detection system of claim 10, wherein a current point is determined to recursively occlude previous points if it occludes a set of points in previous depth images, and in the set points in later depth images occlude points in earlier depth images.

13. The moving object detection system of claim 11, wherein a current point is determined to be recursively occluded by previous points if it is occluded by a set of points in a previous depth image, and in the set points in later depth images are occluded by points in earlier depth images.

14. A method for detecting one or more moving objects, the method comprising:

capturing, by an input module, measurements of distances to points on one or more objects, and optionally creating a point cloud therefrom;

providing the measurements captured by the input module directly to a detection module or optionally from the point cloud to the detection module;

configuring the detection module to determine whether the objects are moving objects by tests determining (1) whether currently measured points occlude any previously measured points, (2) whether the currently measured points recursively occlude any previously measured points, and whether the currently measured points are recursively occluded by any previously measured points, and where any positive result of the tests indicates a moving object and where all negative results indicate a static object;

wherein the determination of occlusion is performed based on a depth image by comparing the depth of the currently measured points with previously measured ones that project to the same or adjacent pixels of the depth image;

wherein the occlusion results are corrected by an additional false positive rejection (FPR) test based on the principle that a point on the moving object should be distant from stationary map points, said FRP test following the occlusion determination and comprising the steps of:

performing a map consistency check on multiple recent depth images by retrieving all non-event points in the pixel where the current point is projected and in neighboring pixels, for any retrieved point, if there exists a point with a similar depth to that of the current point, considering it a stationary point, and revising the dynamic event point to be a non-event one, whereby false positives are removed; and controlling the movement of a vehicle on the basis of the object detection.

15. The method of claim 14, wherein the determination of whether the points are located on moving objects is made by conducting the tests either sequentially or simultaneously, the method being configured with other processing steps for performance enhancements.

16. The method of claim 14, wherein the previously measured points of the moving objects are at least partially excluded in the determination of occlusion for currently measured points.

17. The method of claim 14, wherein the determination of occlusion is performed based on a depth image by comparing the depth of the currently measured points with previously measured ones that are projected to the same or adjacent pixels of the depth image to determine the occlusion, the occlusion results being corrected by additional tests for performance enhancements.

18. The method of claim 17, wherein the points are projected to the depth image by one of a spherical projection, a perspective projection, or a projection that projects points lying on neighboring lines of sight to neighboring pixels.

19. The method of claim 18, wherein in a moving platform, the depth image is attached to a pose read from an external motion sensing module, indicating under which pose the depth image is constructed and points are configured to be transformed to this pose before projection to the depth image.

20. The method of claim 18, wherein for each pixel of the depth image, the detection module is configured to save at least a selected number of points projected therein, and/or at least a select number of the depths of points projected therein, and/or the statistical information comprising a minimum value, a maximum value, or a variance of depths of at least a selected number of points projected therein, and/or other information of the occluded points attached to points projected therein.

21. The method of claim 18, wherein multiple depth images are constructed at multiple prior poses, and each is constructed from points starting from the respective pose and accumulating for a certain period of time.

22. The method of claim 21, wherein for each point of a pixel, the detection module is configured to save all points in a previous depth image that are located on either dynamic or static objects, whether they occlude the point or are occluded by the point.

23. The method of claim 21, wherein the occlusion of current points is determined against at least a selected number of depth images previously constructed.

24. The method of claim 23, wherein a current point is determined to occlude previous points if its depth is smaller than any points contained in adjacent pixels of any depth image to which it is projected.

25. The method of claim 23, wherein a current point is determined to be occluded by previous points if its depth is greater than any points contained in adjacent pixels of any depth image to which it is projected.

26. The method of claim 24, wherein a current point is determined to recursively occlude previous points if it occludes a set of points in previous depth images, and in the set points in later depth images it occludes points in earlier depth images.

27. The method of claim 25, wherein a current point is determined to be recursively occluded by previous points if it is occluded by a set of points in a previous depth image, and the set points in later depth images are occluded by points in earlier depth images.

28. A non-transitory computer-readable storage medium having stored therein program instructions that, when executed by a processor of a computing system, cause the processor to execute a method for detecting one or more moving objects, the method comprising:

capturing, by an input module, measurements of distances to points on one or more objects and optionally creating a point cloud therefrom;

providing the measurements captured by the input module directly to a detection module or optionally from the point cloud to the detection module; and configuring the detection module to determine whether the objects are moving objects, by determining whether currently measured points occlude any previously measured points, and/or whether the currently measured points recursively occlude any previously measured points, and/or whether the currently measured points are recursively occluded by any previously measured points, wherein the object detection controls the movement of a vehicle;

wherein the determination of occlusion is performed based on a depth image by comparing the depth of the currently measured points with previously measured ones that project to the same or adjacent pixels of the depth image;

wherein the occlusion results are corrected by an additional false positive rejection (FPR) test based on the principle that a point on the moving object should be distant from stationary map points, said FRP test following the occlusion determination and comprising the steps of:

performing a map consistency check on multiple recent depth images by retrieving all non-event points in the pixel where the current point is projected and in neighboring pixels, for any retrieved point, if there exists a point with a similar depth to that of the current point, considering it a stationary point, and revising the dynamic event point to be a non-event one, whereby false positives are removed.

29. The moving object detection system of claim 1 wherein the input module comprises at least one of a light detection and ranging (LiDAR) sensor, a laser scanner, an ultrasonic sensor, a radar, or any suitable sensor that captures the three-dimensional (3-D) structure of a moving object or a stationary object from the viewpoint of the sensor.

30. The moving object detection system of claim 1 wherein the detection module is one or more of a programmed computer or microcontroller, an application-specific integrated circuit (ASIC), a programable gate array or other analog or digital logic circuit.

31. A moving object detection system, comprising:

an input module configured to capture a point cloud comprising measurements of distances to points on one or more objects;

a detection module configured to receive the point cloud captured by the input module and configured to determine whether the objects are moving objects, (1) by determining that an object, when moving perpendicular to a ranging direction of the input module, partially or wholly occludes the background objects that have been previously detected and (2) by determining that an object, when moving parallel to the ranging direction, occludes or can be occluded by itself repeatedly; and controlling the movement of a vehicle on the basis of the object detection.

32. A control system for a vehicle, comprising:

an input module configured to capture a point stream comprising measurements of distances to points on one or more objects in front of the vehicle;

a detection module configured to receive the point stream captured by the input module and configured to determine whether the points belong to moving objects by performing tests determining (1) whether currently measured points on the object occlude any previously measured points, (2) whether the currently measured points on the object recursively occlude any previously measured points, and (3) whether the currently measured points on the object are recursively occluded by any previously measured points, whereby a positive result of any of tests (1)-(3) indicates the object is moving; and controlling the movement of the vehicle on the basis of the detection of the moving objects.

* * * * *